(12) United States Patent
Tellex et al.

(10) Patent No.: US 11,847,841 B2
(45) Date of Patent: Dec. 19, 2023

(54) PROBABILISTIC OBJECT MODELS FOR ROBUST, REPEATABLE PICK-AND-PLACE

(71) Applicant: Brown University, Providence, RI (US)

(72) Inventors: Stefanie Tellex, Cambridge, MA (US); John Oberlin, Providence, RI (US)

(73) Assignee: Brown University, Providence, RI (US)

( * ) Notice: Subject to any disclaimer, the term of this patent is extended or adjusted under 35 U.S.C. 154(b) by 493 days.

(21) Appl. No.: 16/757,332

(22) PCT Filed: Oct. 18, 2018

(86) PCT No.: PCT/US2018/056514
§ 371 (c)(1),
(2) Date: Apr. 17, 2020

(87) PCT Pub. No.: WO2019/079598
PCT Pub. Date: Apr. 25, 2019

(65) Prior Publication Data
US 2020/0368899 A1    Nov. 26, 2020

Related U.S. Application Data

(60) Provisional application No. 62/573,890, filed on Oct. 18, 2017.

(51) Int. Cl.
G06V 20/00        (2022.01)
G06V 20/64        (2022.01)
(Continued)

(52) U.S. Cl.
CPC .............. *G06V 20/64* (2022.01); *B25J 9/042* (2013.01); *B25J 9/163* (2013.01); *B25J 9/1612* (2013.01);
(Continued)

(58) Field of Classification Search
CPC . B25J 9/163; B25J 9/042; B25J 9/1612; B25J 19/023; G06N 7/005; G06T 7/74;
(Continued)

(56) References Cited

U.S. PATENT DOCUMENTS

| | | |
|---|---|---|
| 5,040,056 A | 8/1991 | Sager et al. |
| 7,574,019 B2 | 8/2009 | Mittal et al. |

(Continued)

FOREIGN PATENT DOCUMENTS

| | | |
|---|---|---|
| CN | 103051893 B | 5/2015 |
| RU | 2528140 C1 | 9/2014 |
| WO | 2012089928 A1 | 7/2012 |

OTHER PUBLICATIONS

Compressive Light Field Photography, Marwah et al (Year: 2017).*
(Continued)

*Primary Examiner* — Ian Jen
(74) *Attorney, Agent, or Firm* — Adler Pollock & Sheehan P.C.

(57) ABSTRACT

A method includes, as a robot encounters an object, creating a probabilistic object model to identify, localize, and manipulate the object, the probabilistic object model using light fields to enable efficient inference for object detection and localization while incorporating information from every pixel observed from across multiple camera locations.

14 Claims, 2 Drawing Sheets
(2 of 2 Drawing Sheet(s) Filed in Color)

(51) Int. Cl.
   *G06T 7/73* (2017.01)
   *B25J 9/04* (2006.01)
   *B25J 9/16* (2006.01)
   *B25J 19/02* (2006.01)
   *G06N 7/01* (2023.01)
   *G06V 10/772* (2022.01)
   *G06V 10/84* (2022.01)

(52) U.S. Cl.
   CPC .............. *B25J 19/023* (2013.01); *G06N 7/01* (2023.01); *G06T 7/74* (2017.01); *G06V 10/772* (2022.01); *G06V 10/84* (2022.01); *G06T 2207/20076* (2013.01); *G06T 2207/30164* (2013.01)

(58) Field of Classification Search
   CPC ........... G06T 2207/20076; G06T 2207/30164; G06V 20/64; G06K 9/6296; G06K 9/6255
   See application file for complete search history.

(56) References Cited

U.S. PATENT DOCUMENTS

| | | | |
|---|---|---|---|
| 7,854,108 | B2 | 12/2010 | Koselka et al. |
| 7,933,451 | B2 | 4/2011 | Kloer |
| 8,204,839 | B2 | 6/2012 | Lee et al. |
| 8,374,388 | B2 | 2/2013 | Stolkin et al. |
| 8,472,698 | B2 | 6/2013 | Agrawal et al. |
| 8,527,445 | B2 | 9/2013 | Karins et al. |
| 8,638,985 | B2 | 1/2014 | Shotton et al. |
| 8,693,731 | B2 | 4/2014 | Holz et al. |
| 8,773,508 | B2 * | 7/2014 | Daniel ...................... G06T 7/55 348/57 |
| 8,810,648 | B2 | 8/2014 | Bibby et al. |
| 9,333,649 | B1 | 5/2016 | Bradski et al. |
| 9,400,503 | B2 | 7/2016 | Kearns et al. |
| 9,600,982 | B2 | 3/2017 | Macintosh |
| 9,701,015 | B2 | 7/2017 | Buehler et al. |
| 9,717,387 | B1 | 8/2017 | Szatmary et al. |
| 9,832,452 | B1 | 11/2017 | Fotland et al. |
| 9,868,215 | B2 | 1/2018 | Suzuki |
| 9,889,566 | B2 | 2/2018 | Tan et al. |
| 9,927,815 | B2 | 3/2018 | Nusser et al. |
| 10,089,740 | B2 | 10/2018 | Srikanth et al. |
| 10,372,968 | B2 | 8/2019 | Aghamohammadi et al. |
| 2011/0071675 | A1 | 3/2011 | Wells et al. |
| 2015/0254868 | A1 | 9/2015 | Srikanth et al. |
| 2015/0269439 | A1 * | 9/2015 | Versace .................. G06V 20/10 382/103 |
| 2016/0084642 | A1 * | 3/2016 | Bradski .................. B25J 9/1612 348/136 |
| 2016/0084956 | A1 * | 3/2016 | Stainvas Olshansky ..................... G01S 13/89 342/195 |
| 2016/0221187 | A1 | 8/2016 | Bradski et al. |
| 2017/0121113 | A1 | 5/2017 | Wagner et al. |
| 2018/0036774 | A1 | 2/2018 | Lukka et al. |
| 2018/0297215 | A1 | 10/2018 | Oberlin et al. |
| 2019/0071261 | A1 | 3/2019 | Wertenberger et al. |

OTHER PUBLICATIONS

PCT/US2018/056514 International Search Report and Written Opinion; dated Jan. 23, 2019.
Szeliski, Richard, "Computer Vision: Algorithms and Applications", Springer, Available at <https://www.cs.ccu.edu.tw/~damon/tmp/SzeliskiBook_20100903_draft.pdf>, 2010, 978 pages.
"Object Recognition Kitchen", Available Online at <https://wg-perception.github.io/object_recognition_core/>, 2 pages.
Banta et al., "A Next-Best-View System for Autonomous 3-D Object Reconstruction", IEEE Transactions on Systems, Man, and Cybernetics—Part A: Systems and Humans, vol. 30, No. 5, Sep. 2000, pp. 589-598.
Beetz et al., "Robotic Roommates Making Pancakes", 11th IEEE-RAS International Conference on Humanoid Robots, Oct. 2011, pp. 529-536.
Bollini et al., "Interpreting and Executing Recipes with a Cooking Robot", In Proceedings of International Symposium on Experimental Robotics, 2012, 15 pages.
Calli et al., "The YCB Object and Model Set: Towards Common Benchmarks for Manipulation Research", International Conference on Advanced Robotics, 2015, 8 pages.
Collet et al., "HerbDisc: Towards lifelong Robotic Object Discovery", The International Journal of Robotics Research, vol. 34, No. 1, 2014, pp. 3-25.
Elgammal et al., "Background and Foreground Modeling Using Nonparametric Kernel Density Estimation for Visual Surveillance", Proceedings of the IEEE, vol. 90, No. 7, Jul. 2002, pp. 1151-1163.
Engel et al., "LSD-SLAM: Large-Scale Direct Monocular SLAM", In Computer Vision—ECCV 2014, 2014, pp. 834-849.
Eppner et al., "Lessons From the Amazon Picking Challenge: Four Aspects of Building Robotic Systems", In Proceedings of Robotics: Science and Systems, Jun. 2016, 10 pages.
Felzenszwalb et al., "A Discriminatively Trained, Multiscale, Deformable Part Model", IEEE Conference on Computer Vision and Pattern Recognition, 2008, 8 pages.
Gallagher et al., "Gatmo: A Generalized Approach to Tracking Movable Objects", IEEE International Conference on Robotics and Automation, 2009, pp. 2043-2048.
Georgiev et al., "Lytro Camera Technology: Theory, Algorithms, Performance Analysis", Proceedings of SPIE—The International Society for Optical Engineering, vol. 8667, 2013, pp. 86671J-1-86671J-10.
Girshick et al., "Rich Feature Hierarchies for Accurate Object Detection and Semantic Segmentation", IEEE Conference on Computer Vision and Pattern Recognition, 2014, pp. 580-587.
Goldfeder et al., "The Columbia Grasp Database", IEEE International Conference on Robotics and Automation, 2009, pp. 1710-1716.
Gori et al., "Three-Finger Precision Grasp on Incomplete 3D Point Clouds", IEEE International Conference on Robotics & Automation, 2014, pp. 5366-5373.
Guadarrama et al., "Open-Vocabulary Object Retrieval", In Proceedings of Robotics: Science and Systems, 2014, 9 pages.
Herbst et al., "Toward Object Discovery and Modeling via 3-D Scene Comparison", IEEE International Conference on Robotics and Automation, 2011, pp. 2623-2629.
Huang et al., "Programming by Demonstration with User-Specified Perceptual Landmarks", arXiv:1612.00565v1, 2016, 8 pages.
Kasper et al., "The Kit Object Models Database: an Object Model Database for Object Recognition, Localization and Manipulation in Service Robotics", The International Journal of Robotics Research, vol. 31, No. 8, 2012, pp. 927-934.
Katz et al., "Manipulating Articulated Objects With Interactive Perception", IEEE International Conference on Robotics and Automation, May 2008, pp. 272-277.
Kent et al., "Construction of an Object Manipulation Database From Grasp Demonstrations", IEEE/RSJ International Conference on Intelligent Robots and Systems, 2014, pp. 3347-3352.
Kent et al., "Crowdsourcing the Construction of a 3D Object Recognition Database for Robotic Grasping", IEEE International Conference on Robotics and Automation, 2014, pp. 4526-4531.
Knepper et al., "Single Assembly Robot in Search of Human Partner: Versatile Grounded Language Generation", In Proceedings of Human-Robot Interaction, 2013, pp. 167-168.
Kraft et al., "Development of Object and Grasping Knowledge by Robot Exploration", IEEE Transactions on Autonomous Mental Development, vol. 2, No. 4, Dec. 2010, pp. 368-383.
Huang et al., "Visual Odometry and Mapping for Autonomous Flight Using an RGB-D Camera", International Symposium on Robotics Research, 2011, pp. 1-16.
Wong et al. "Data Association for Semantic World Modeling from Partial Views", International Journal of Robotics Research, vol. 34 No. 7, 2015, pp. 1064-1082.

(56) References Cited

OTHER PUBLICATIONS

Krainin et al., "Manipulator and Object Tracking for in-hand 3D Object Modeling", The International Journal of Robotics Research, vol. 30, No. 11, 2011, pp. 1311-1327.

Lai et al., "A Large-Scale Hierarchical Multi-View RGB-D Object Dataset", IEEE International Conference on Robotics and Automation, May 9-13, 2011, pp. 1817-1824.

Lai et al., "A Scalable Tree-based Approach for Joint Object and Pose Recognition", Proceedings of the Twenty-Fifth AAAI Conference on Artificial Intelligence, 2011, pp. 1474-1480.

Le et al., "Learning to Grasp Objects with Multiple Contact Points", IEEE International Conference on Robotics and Automation, 2010, pp. 5062-5069.

Lowe, David G, "Distinctive Image Features from Scale-Invariant Keypoints", International Journal of Computer Vision, vol. 60, No. 2, 2004, pp. 91-110.

Lyubova et al., "Improving Object Learning through Manipulation and Robot Self-Identification", IEEE International Conference on Robotics and Biomimetics, Dec. 2013, pp. 1365-1370.

Maldonado et al., "Robotic Grasping of Unmodeled Objects using Time-of-Flight Range Data and Finger Torque Information", IEEE/RSJ International Conference on Intelligent Robots and Systems, Oct. 18-22, 2010, pp. 2586-2591.

Mansinghka et al., "Approximate Bayesian Image Interpretation using Generative Probabilistic Graphics Programs", In Advances in Neural Information Processing Systems, 2013, pp. 1-9.

Modayil et al., "The Initial Development of Object Knowledge by a Learning Robot", Robotics and autonomous systems, vol. 56, Nov. 30, 2008, pp. 879-890.

Morales et al., "Experimental Prediction of the Performance of Grasp Tasks from Visual Features", Proceedings 2003 IEEE/RSJ International Conference on Intelligent Robots and Systems, Oct. 2003, pp. 3423-3428.

Nguyen et al., "Autonomously Learning to Visually Detect where Manipulation will Succeed", Autonomous Robots, vol. 36, 2014, pp. 137-152.

Pas et al., "Using Geometry to Detect Grasp Poses in 3D Point Clouds", In International Symposium on Robotics Research, 2015, 16 pages.

Pizzoli et al., "REMODE: Probabilistic, Monocular Dense Reconstruction in Real Time", IEEE International Conference on Robotics & Automation, May 31-Jun. 7, 2014, pp. 2609-2616.

Rao et al., "Grasping Novel Objects with Depth Segmentation", IEEE/RSJ International Conference on Intelligent Robots and Systems, Oct. 18-22, 2010, pp. 2578-2585.

Rosten et al., "Machine Learning for High-speed Corner Detection", Computer Vision-European Conference on Computer Vision, 2006, pp. 430-443.

Sahbani et al., "A Hybrid Approach for Grasping 3D Objects", IEEE/RSJ International Conference on Intelligent Robots and Systems, Oct. 11-15, 2009, pp. 1272-1277.

Salas-Moreno et al., "Slam++: Simultaneous Localisation and Mapping at the Level of Objects", Proceedings of the IEEE Conference on Computer Vision and Pattern Recognition, 2013, pp. 1352-1359.

Saxena et al., "Robotic Grasping of Novel Objects using Vision", The International Journal of Robotics Research, vol. 27, No. 2, Feb. 2008, pp. 157-173.

Schiebener et al., "Integrating Visual Perception and Manipulation for Autonomous Learning of Object Representations", Adaptive Behavior, vol. 21, No. 5, 2013, pp. 328-345.

Selvatici et al., "Object-based Visual Slam: How Object Identity Informs Geometry", Presented at the IV Workshop de Visao Computacional, 2008, 6 pages.

Stolkin, Rustam Alexander George, "Combining Observed and Predicted Data for Robot Vision in Poor Visibility", ProQuest Dissertations, Mar. 2004, 226 pages.

Szegedy et al., "Deep Neural Networks for Object Detection", Advances in Neural Information Processing Systems, Jan. 2013, 10 pages.

Ude et al., "Integrating Surface-based Hypotheses and Manipulation for Autonomous Segmentation and Learning of Object Representations", IEEE International Conference on Robotics and Automation, May 14-18, 2012, pp. 1709-1715.

Velez et al., "Active Exploration for Robust Object Detection", Proceedings of the Twenty-Second International Joint Conference on Artificial Intelligence, 2011, pp. 2752-2757.

Wang et al., "Simultaneous Localization, Mapping and Moving Object Tracking", The International Journal of Robotics Research, vol. 26, No. 9, Sep. 2007, pp. 889-916.

\* cited by examiner

PROBABILISTIC OBJECT MODELS FOR ROBUST, REPEATABLE PICK-AND-PLACE

CROSS REFERENCE TO RELATED APPLICATIONS

This application is a national phase filing under 35 U.S.C. § 371 of International Application No. PCT/US2018/056514, filed Oct. 18, 2018, which claims benefit from U.S. Provisional Patent Application No. 62/573,890, filed Oct. 18, 2017, the entire contents of which are incorporated by reference.

STATEMENT REGARDING GOVERNMENT INTEREST

None.

BACKGROUND OF THE INVENTION

The present invention relates generally to object recognition and manipulation, and more particularly to probabilistic object models for robust, repeatable pick-and-place.

In general, most robots cannot pick up most objects most of the time. Yet for effective human-robot collaboration, a robot must be able to detect, localize, and manipulate the specific objects that a person cares about. For example, a household robot should be able to effectively respond to a person's commands such as "Get me a glass of water in my favorite mug," or "Clean up the workshop." For these tasks, extremely high reliability is needed; if a robot can pick at 95% accuracy, it will still fail one in twenty times. Considering it might be doing hundreds of picks each day, this level of performance will not be acceptable for an end-to-end system, because the robot will miss objects each day, potentially breaking a person's things.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an aspect, the invention features a method including, as a robot encounters an object, creating a probabilistic object model to identify, localize, and manipulate the object, the probabilistic object model using light fields to enable efficient inference for object detection and localization while incorporating information from every pixel observed from across multiple camera locations.

In another aspect, the invention features a method including using light fields to generate a probabilistic generative model for objects, enabling a robot to use all information from a camera to achieve precision.

In still another aspect, the invention features a system including a robot arm, multiple cameras locations, and a process for creating a probabilistic object model to identify, localize, and manipulate an object, the probabilistic object model using light fields to enable efficient inference for object detection and localization while incorporating information from every pixel observed from across the multiple camera locations.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The patent or application file contains at least one drawing executed in color. Copies of this patent or patent application publication with color drawings will be provided by the Office upon request and payment of the necessary fee.

These and other features, aspects, and advantages of the present invention will become better understood with reference to the following description, appended claims, and accompanying drawings where:

DETAILED DESCRIPTION

Figure 1:
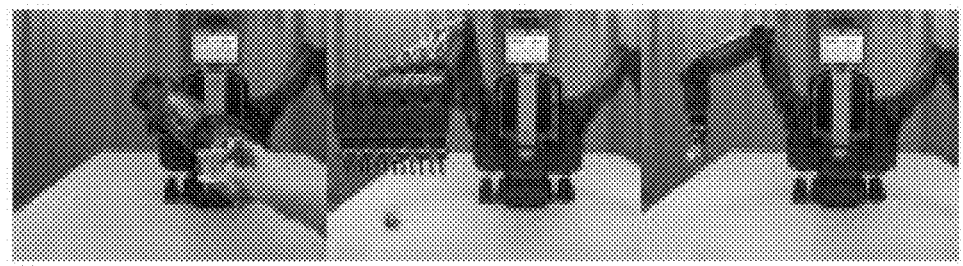
FIG. 1 illustrates how an exemplary model enables a robot to learn to robustly detect, localize and manipulate objects.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Robust object perception is a core capability for a manipulator robot. Current perception techniques do not reach levels of precision necessary for a home robot, which might be requested to pick hundreds of times each day and where picking errors might be very costly, resulting in broken objects and ultimately, in the person's rejection of the robot. To address this problem, the present invention enables the robot to learn a model of an object using light fields, achieving very high levels of robustness when detecting, localizing, and manipulating objects. We present a generative model for object appearance and pose given observed camera images. Existing approaches use features, which discard information, because inference in a full generative model is intractable. We present a method that uses light fields to enable efficient inference for object detection and localization, while incorporating information from every pixel observed from across multiple camera locations. Using the learned model, the robot can segment objects, identify object instances, localize them, and extract three dimensional (3D) structure. For example, our method enables a Baxter robot to pick an object hundreds of times in a row without failures, and to autonomously create models of objects for many hours at a time. The robot can identify, localize and grasp objects with high accuracy using our framework; modeling one side of a novel object takes a Baxter robot approximately 30 seconds and enables detection and localization to within 2 millimeters. Furthermore, the robot can merge object models to create metrically grounded models for object categories, in order to improve accuracy on previously unencountered objects.

Existing systems for generic object detection and manipulation have lower accuracy than instance-based methods and cannot adapt on the fly to objects that do not work the first time. Instance based approaches can have high accuracy but require object models to be provided in advance; acquiring models is a time consuming process that is difficult for even an expert to perform. For example, the winning team from the Amazon Picking Challenge in 2015 used a system that required specific instance-based data to do pose estimation and still found that perception was a major source of system errors. Autonomously learning 3D object models requires expensive ICP-based methods to localize objects, which are expensive to globally optimize, making them impractical for classification.

To achieve extremely high accuracy picking, we reframe the problem to one of adaptation and learning. When the robot encounters a novel object, its goal is to create a model that contains the information needed to identify, localize, and manipulate that object with extremely high accuracy and robustness. We term this information a probabilistic object model (POM). After learning a POM, the robot is able to robustly interact with the object, as shown in FIG. 1. We represent POMs using a pixel-based inverse graphics approach based around light fields. Unlike feature-based methods, pixel based inverse graphics methods use all information obtained from a camera. Inference in inverse-graphics methods is computationally expensive because the program must search a very large space of possible scenes and marginalize over all possible images. Using the light field approach, a robot can automatically acquire a POM by exploiting its ability to change the environment in service of its perceptual goals. This approach enables the robot to obtain extremely high accuracy and repeatability at localizing and picking objects. Additionally, a robot can create metrically grounded models for object categories by merging POMs.

The present invention demonstrates that a Baxter robot can autonomously create models for objects. These models enable the robot to detect, localize, and manipulate the objects with very high reliability and repeatability, localizing to within 2 mm for hundreds of successful picks in a row. Our system and method enable a Baxter robot to autonomously map objects for many hours using its wrist camera.

Figure 2:
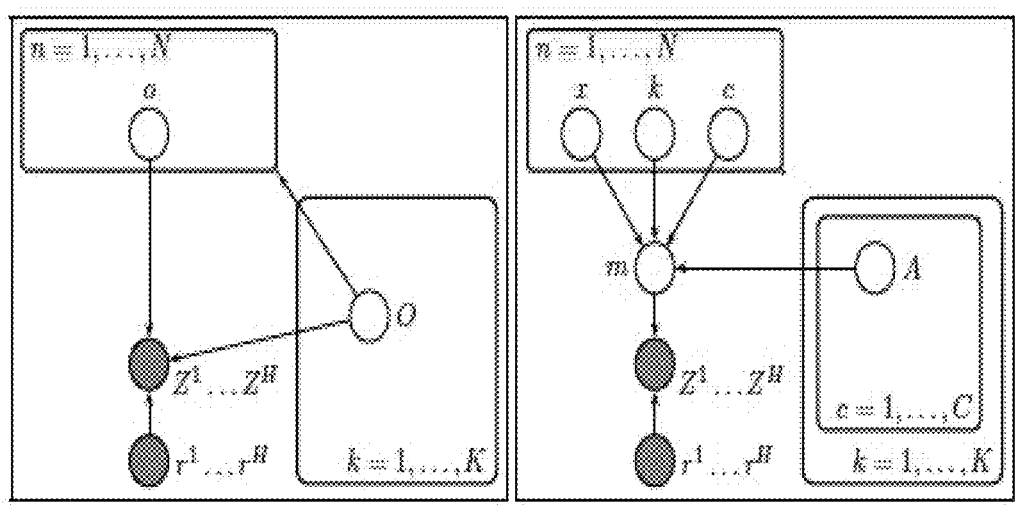
FIG. 2 illustrates an exemplary probabilistic object map model for reasoning about objects.

We present a probabilistic graphical model for object detection, localization, and modeling. We first describe the model, then inference in the model. The graphical model is depicted in FIG. 2, while a table of variables appears in Table I.

TABLE I

| | Variables |
|---|---|
| $u_i \in A$ | Action |
| $o_n$ | Object instance, from a set of N instances. |
| $O_k$ | Object map, from a set of K maps. |
| $A$ | Object appearance model. |
| $x$ | Object's pose. |
| $Z = \langle Z^1 \ldots Z^H \rangle$ | The sequence of H images observed at time t. Each image is indexed by (i, j). |
| $r = \langle r^r \ldots r^H \rangle$ | The sequence of poses of the robot's end effector. |
| $m$ | The light field grid at time t, indexed by (l, w). |
| $k$ | Object type index. |
| $c$ | Configuration index. |

Probabilistic Object Model

A goal is for a robot to estimate objects in a scene, $o^1, \ldots o^N$, given observations of camera images, $Z^1 \ldots Z^H$ and associated camera poses, $r^o \ldots r^H$:

$$\operatorname*{argmax}_{o^1 \ldots o^N} P(o^1 \ldots o^N \mid Z^1 \ldots Z^H, r^1 \ldots r^H) \quad (1)$$

Each object instance, $o^N$, consists of a pose, $x^N$, along with an index, $k^N$, which identifies the object type. Each object type, $O^k$, is a set of appearance modes. We rewrite the distribution using Bayes' rule:

$$P(o^1 \ldots o^N \mid Z^1 \ldots Z^H, r^o \ldots r^H) = \quad (2)$$
$$\frac{P(Z^1 \ldots Z^H \mid o^1 \ldots o^N, r^o \ldots r^H) P(o^0 \ldots o^N)}{P(Z^1 \ldots Z^H \mid r^o \ldots r^H)}$$

$$\propto P(Z^1 \ldots Z^H \mid o^1 \ldots o^N, r^o \ldots r^H) P(o^0 \ldots o^N) \quad (3)$$

We assume a uniform prior over object locations and appearances, so that only the first term matters in the optimization.

A generative, inverse graphics approach would assume each image is independent given the object locations, since if we know the true locations and appearances of the objects, we can predict the contents of the images using graphics:

$$P(Z^1 \ldots Z^H \mid o^1 \ldots o^N, r^0 \ldots r^H) \approx \prod_h P(Z^h \mid o^1 \ldots o^N, r^0 \ldots r^H) \quad (4)$$

This model is known as inverse graphics because it requires assigning a probability to images given a model of the scene. However, inference under these assumptions is intractable because of the very large space of possible images. Existing approaches turn to features such as SIFT or learned features using neural networks, but these approaches throw away information in order to achieve more generality. Instead we aim to use all information to achieve the most precise localization and manipulation possible.

To solve this problem, we introduce the light field grid, m as a latent variable. We define a distribution over the light rays emitted from a scene. Using this generative model, we can then perform inferences about the objects in the scene, conditioned on observed light rays, R, where each ray corresponds to a pixel in one of the images, $Z^h$, combined with a camera calibration function that maps from pixel space to a light ray given camera pose. We define a synthetic photograph, m, as an L×W array of cells in a plane in space. Each cell (l, w)∈m has a height z and scatters light at its (x, y, z) location. We assume each observed light ray arose from a particular cell (l, w), so that the parameters associated with each cell include its height z and a model of the intensity of light emitted from that cell.

We integrate over m as a latent variable:

$$P(Z^1 \ldots Z^H \mid o^1 \ldots o^N, r^0 \ldots r^H) = \int_m P(Z^1 \ldots Z^H \mid m, r^0 \ldots r^H) \times P(m \mid o^1 \ldots o^N) dm \quad (5)$$

Then we factor this distribution assuming images are independent given the light field model m:

$$\int_m \left[ \prod_{l,w} P(R_{l,w} \mid m, r^0 \ldots r^H) \right] \times [P(m \mid o^1 \ldots o^N)] dm \quad (6)$$

Figure 4:
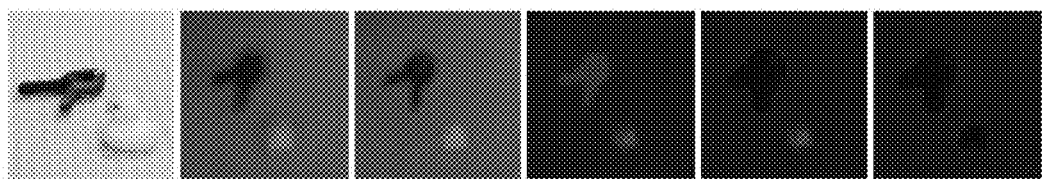
FIG. 4 illustrates an exemplary observed view for a scene.

Here $R_{l,w}$ is the bundle of rays that arose from map cell (l,w), which can be determined finding all rays that intersect the cell using the calibration function. This factorization assumes that each bundle of rays is conditionally independent given the cell parameters, an assumption valid for cells that do not actively emit light. We can render m as an image by showing the values for $o^2_{l,w}$ as the pixel color; however variance information $\mu_{l,w}$ is also stored. FIG. 4 shows example scenes rendered using this model. The first term in Equation 6 corresponds to light field rendering. The second term corresponds to the light field distribution in a synthetic photograph given a model of the scene as objects.

We assume each object has only a few configurations, $c \varepsilon C$, at which it may lie at rest. This assumption is not true in general; for example, a ball has an infinite number of such configurations. However many objects with continuously varying families of stable poses can be approximated using a few sampled configurations. Furthermore this assumption leads to straightforward representations for POMs. In particular, the appearance model, $A_c$, for an object is a model of the light expected to be observed from the object by a camera. At both modeling time and inference time, we render a synthetic photograph of the object from a canonical view (e.g., top down or head-on), enabling efficient inference in the a lower-dimensional subspace instead of being required to do full 3D inference as in ICP. This lower-dimensional subspace enables much deeper and finer-grained search so that we can use all information from pixels to perform very accurate pose estimation.

Inference

---

Algorithm 1

Render the observed view from images and poses at a particular plane, z.

1: function OBSERVEDVIEW ($Z^0 \ldots Z^H, r^0 \ldots r^H, z$)
2: $\quad$ m* ← zeros (L, W, 3)
3: $\quad$ counts* ← zeros (L, W)
4: $\quad$ for $Z^h \in Z^0 \ldots Z^H$ do
5: $\quad\quad$ for ray ∈ $Z^h$ do
6: $\quad\quad\quad$ l, w ← C (ray, $r^h$, z)
7: $\quad\quad\quad$ m*[l, w] ← m*[l, w] + intensity (ray)
8: $\quad\quad\quad$ counts[l, w] ← counts[l, w] + 1
9: $\quad$ for l ∈ 1 ... L do
10: $\quad\quad$ for w ∈ 1 ... W do
11: $\quad\quad\quad$ $m*[l, w] \leftarrow \dfrac{m*[l, w]}{\text{counts}*[l, w]}$
12: $\quad$ return m*

---

Algorithm 2

Render the predicted view given a scene with objects and appearance models.

1: function PREDICTEDVIEW($o^1 \ldots o^N$)
2: $\quad$ m̂ ← zeros(l, w)
3: $\quad$ for $(x^n, k^n, c^n) \in o^1 \ldots o^N$ do
4: $\quad\quad$ for i, j ∈ $A_k^c$ do
5: $\quad\quad\quad$ l, w ← transform(i, j, $x^n$)
6: $\quad\quad\quad$ m̂[l, w] ← $A_k^c$[i, j]
7: $\quad$ return m̂

---

Algorithm 3
Infer scene.

1: function INFERSCENE($Z^1 \ldots Z^H, r^1 \ldots r^H, z, o$)
2: $\quad$ objects ← [ ]
3: $\quad$ while d < ε do
4: $\quad\quad$ o, d ← INFEROBJECT ($Z^1 \ldots Z^H, r^1 \ldots r^H$, objects)
5: $\quad\quad$ Add o to objects.

---

Algorithm 4
Infer object.

1: function INFEROBJECT($Z^1 \ldots Z^H, r^1 \ldots r^H, z, o^1 \ldots o^n$)
2: $\quad$ m* ← OBSERVEDVIEW($Z^o \ldots Z^H, r^o \ldots r^H, z$)
3: $\quad$ bestO ← null
4: $\quad$ bestDiscrepancy ← 0
5: $\quad$ for k ∈ K do
6: $\quad\quad$ for c ∈ $C_k$ do
7: $\quad\quad\quad$ for (x, y, θ) ∈ X, Y, ⊖ do
8: $\quad\quad\quad\quad$ o ← ((x, y, θ), $A_k^c$)
9: $\quad\quad\quad\quad$ m̂ ← PREDICTEDVIEW($o^1 \ldots o^n$, o)
10: $\quad\quad\quad\quad$ d ← DISCREPANCY(m*, m̂)
11: $\quad\quad\quad\quad$ if d < bestDiscrepancy then
12: $\quad\quad\quad\quad\quad$ bestO ← o
13: $\quad\quad\quad\quad\quad$ bestDiscrepancy ← d
14: $\quad$ return o, bestDiscrepancy

---

Using Equation 6 to find the objects that maximize a scene is still challenging because it requires integrating over all values for the variances of the map cells and searching over a full 3D configuration of all objects. Instead we approximate it by performing inference in the space of light field maps, m and integral finding the map m and scene (objects) that maximizes the integral.

First, we find the value for m that maximizes the likelihood of the observed images in the first term:

$$m^* \equiv \operatorname*{argmax}_{m} \prod_{l,w} p(R_{l,w} | m, r^0 \ldots r^H). \quad (7)$$

This m* is the observed view. We compute the maximum likelihood estimate from image data analytically by finding the sample mean and variance for pixel values observed at each cell using the calibration function. An example observed view is shown in FIG. 4. We use the approximation that each ray is assigned to the cell it intersects without reasoning about obstructions. Algorithm 1 gives a formal description of how to compute it from calibrated camera images. This view can be computed by iterating through each image one time, linear in the number of pixels or light rays. For a given scene (i.e., object configuration and appearance models), we can compute an m that maximizes the second term in Equation 6.

$$\hat{m} \equiv \operatorname*{argmax}_{m} \prod_{l,w} p(m^{l,w} | o^0 \ldots o^N, O_1 \ldots O_K). \quad (8)$$

This ^m is the predicted view; an example predicted view is shown in FIG. 4. This computation corresponds to a rendering process. Our model enables us to render compositionally over object maps and match in the 2D configuration space with three degrees of freedom instead of the 3D space with six.

To maximize the product over scenes $o^0 \ldots o^N$, we can compute the discrepancy between the observed view and predicted view, shown in FIG. 4. Finding the configuration of objects that minimizes this discrepancy corresponds to maximizing the log-likelihood of the scene under the observed images. Additionally, the robot can use this discrepancy as a mask for object segmentation by mapping a region, adding an object to the scene, and then remapping the region; discrepant regions correspond to cells associated with the new object. Algorithm 2 gives a description of how to compute it given a scene defined as object poses and appearance models.

To infer a scene, the system computes the observed map and then incrementally adds objects to the scene until the discrepancy is less than a predefined threshold. At this point, all of the discrepancy has been accounted for, and the robot can use this information to ground natural language referring expressions such as "next to the bowl," to find empty space in the scene where objects can be placed, and to infer object pose for grasping.

Learning Probabilistic Object Models

Modeling objects requires estimating Ok for each object k, including the appearance models for each stable configuration. We have created a system that enables a Baxter robot to autonomously map objects for hours at a time. We first divide the workspace for one arm of the robot into three regions: an input pile, a mapping space, and an output pile. The robot creates a model for the input pile and mapping space. Then a person adds objects to the input pile, and autonomous mapping begins. The robot picks an object from the input pile, moves it to the mapping space, maps the object, then moves it to the output pile.

To pick from the input pile before an object map has been acquired, the robot tries to pick repeatedly with generic grasp detectors. To propose grasps, the robot looks for patterns of discrepancy between the background map and the observed map. Once successful, it places the object in the mapping workspace and creates a model for the mapping workspace with the object. Regions in this model which are discrepant with the background are used to create an appearance model A for the object. After modeling has been completed, the robot clears the mapping workspace and moves on to the next object. Note that there is a trade off between object throughput and information acquired about each object; to increase throughput we can reduce the number of pick attempts during mapping. In contrast, to truly master an object, the robot might try 100 or more picks as well as other exploratory actions before moving on.

If the robot loses the object during mapping (for example because it rolls out of the workspace), the robot returns to the input pile to take the next object. If the robot is unable to grasp the current object to move it out of the mapping workspace, it uses nudging behaviors to push the object out. If its nudging behaviors fail to clear the mapping workspace, it simply updates its background model and then continues mapping objects from the input pile.

Inferring a New Configuration

After a new object has been placed in the workspace, the object model, Ok is known, but the configuration, c is unknown. The robot needs to decide when it has encountered a new object configuration given the collection of maps it has already made. We use an approximation of a maximum likelihood estimate with a geometric prior to decide when to make a new configuration for the object.

Learning Object Categories

Figure 3:
FIG. 3 illustrates exemplary objects.

Once POMs have been acquired, they can be merged to form models for object categories. Many standard computer vision approaches can be applied to light field views rather than images; for example deformable parts models for classification in light field space. These techniques may perform better on the light field view because they have access to metric information, variance in appearance models, as well as information about different configurations and transition information. As a proof of concept, we created models for several object categories. First our robot mapped a number of object instances. Then for each group of instances, we successively applied the optimization in Algorithm 4, with a bias to force the localization to overlap with the model as much as possible. This process results in a synthetic photograph for each category that is strongly biased by object shape and contains noisy information about color and internal structure. Examples of learned object categories appear in FIG. 3. We used our learned models to successfully detect novel instances of each category from a scene with distractor objects. We aim to train on larger data sets and apply more sophisticated modeling techniques to learn object categories and parts from large datasets of POMs.

Evaluation

We evaluate our model's ability to detect, localize, and manipulate objects using the Baxter robot. We selected a subset of YCB objects that were rigid and pickable by Baxter with the grippers in the 6 cm position as well as a standard ICRA duckie. In our implementation the grid cell size is 0:25 cm, and the total size of the synthetic photograph was approximately 30 cm×30 cm. We initialize the background variance to a higher value to account for changes in lighting and shadows.

Localization

To evaluate our model's ability to localize objects, we find the error of its position estimates by servoing repeatedly to the same location. For each trial, we moved the arm directly above the object, then moved to a random position and orientation within 10 cm of the true location. Next we estimated the object's position by serving: first we created a light field model at the arm's current location; then we used Algorithm 3 to estimate the object's position; then we moved the arm to the estimated position and repeated. We performed five trials in each location, then moved the object to a new location, for a total of 25 trials per object. We take the mean location estimated over the five trials as the object's true location, and report the mean distance from this location as well as 95% confidence intervals. This test records the repeatability of the servoing and pose estimation; if we are performing accurate pose estimation, then the system should find the object at the same place each time. Results appear in Table II. Our results show that using POMs, the system can localize objects to within 2 mm. We observe more error on taller objects such as the mustard, and the taller duplo structure, due to our assumption that all cells are at table height. Note that even on these objects, localization is accurate to within a centimeter, enough to pick reliably with many grippers; similarly detection accuracy is also quite high. To assess the effect of correcting for z, we computed new models for the tall yellow square duplo using the two different approaches. We found that the error reduced to 0.0013 m+−2.0×10$^{-0.5}$ using the maximum likelihood estimate and to 0.0019 m+−1.9×10$^{-0.5}$ using the marginal estimate. Both methods demonstrate a significant improvement. The maximum likelihood estimate performs slightly better, perhaps because the sharper edges lead to more consistent performance. Computing z corrections takes significant time, so we do not use it for the rest of the evaluation.

Autonomous Classification and Grasp Model Acquisition

Figure 5:
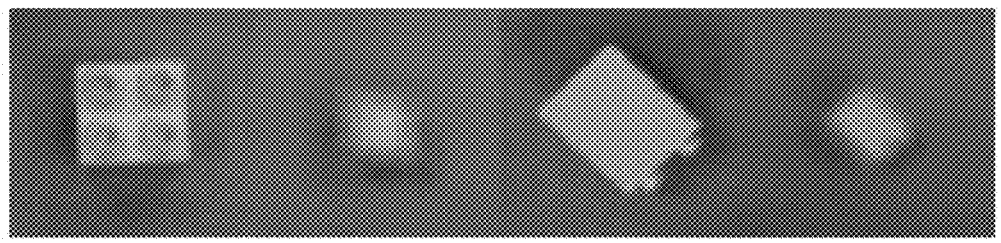
FIG. 5 illustrates automatically generated thumbnails and observed views for two configurations detected for a yellow square duplo.

After using our autonomous process to map our test objects, we evaluated object classification and picking performance. Due to the processing time to infer z, we used z=table for this evaluation. The robot had to identify the object type, localize the object, and then grasp it. After each grasp, it placed the object in a random position and orientation. We report accuracy at labeling the object with the correct type along with its pick success rate over the ten trials in Table II. The robot discovered 1 configuration for most objects, but for the yellow square duplo discovered a second configuration, shown in FIG. 5. We explore more deliberate elicitation of new object configurations, by rotating the hand before dropping the object or by employing bimanual manipulation. We report detection and pick accuracy for the 10 objects.

TABLE II

Performance at Localization, Detection, and Picking

| Object (YCB ID) | Object Height | Localization Accuracy (m) | Detection Accuracy | Pick Accuracy |
|---|---|---|---|---|
| banana (11) | 0.036 m | 0.0004 m ± 1.2 × $10^{-05}$ | 10/10 | 10/10 |
| clamp (large) (46) | 0.035 m | 0.0011 m ± 1.5 × $10^{-05}$ | 10/10 | 10/10 |
| clamp (small) (46) | 0.019 m | 0.0009 m ± 1.2 × $10^{-05}$ | 10/10 | 10/10 |
| duplo (purple arch) (73) | 0.031 m | 0.0010 m ± 2.5 × $10^{-05}$ | 10/10 | 10/10 |
| duplo (yellow square) (73) | 0.043 m | 0.0019 m ± 2.4 × $10^{-05}$ | 9/10 | 8/10 |
| duplo (tall yellow square) (73) | 0.120 m | 0.0040 m ± 4.4 × $10^{-05}$ | 10/10 | 10/10 |
| mustard (9) | 0.193 m | 0.0070 m ± 8.2 × $10^{-05}$ | 10/10 | 10/10[1] |
| padlock (39) | 0.029 m | 0.0013 m ± 3.7 × $10^{-05}$ | 10/10 | 8/10 |
| standard ICRA duckie | 0.042 m | 0.0005 m ± 1.4 × $10^{-05}$ | 10/10 | 7/10 |
| strawberry (12) | 0.044 m | 0.0012 m ± 2.1 × $10^{-05}$ | 10/10 | 10/10 |
| Overall | | 0.0019 m ± 5.2 × $10^{-06}$ | 99/100 | 93/100 |

Our results show 98% accuracy at detection performance for these objects. The duplo yellow square was confused with the standard ICRA duckie which is similarly colored and sized. Other errors were due to taller objects. The robot mapped the tall duplo structure in a lying down position. It was unable to pick it when it was standing up to move it to its scanning workspace because of the error introduced by the height. After a few attempts it knocked it down; the lower height introduced less error, and it was able to pick and localize perfectly. The padlock is challenging because it is both heavy and reflective. Also its smallest dimension just barely fits into the robot's gripper, meaning that very small amounts of position error can cause the grasp to fail. Overall our system is able to pick this data set 84% of the time.

Our automatic process successfully mapped all objects except for the mustard. The mustard is a particularly challenging object due to its height and weight; therefore we manually created an model and annotated a grasp. Our initial experiments with this model resulted in 1=10 picks due to noise from its height and its weight; however we were still able to use it for localization and detection. Next we created a new model using marginal z corrections and also performed z corrections at inference time. Additionally we changed to a different gripper configuration more appropriate to this very large object. After these changes, we were able to pick the mustard 10/10 times.

Picking Robustly

We can pick a spoon 100 times in a row.

In summary, our approach enables a robot to adapt to the specific objects it finds and robustly pick objects many times in a row without failures. This robustness and repeatability outperforms existing approaches in terms of its precision by trading off recall, enabling the robot to robustly pick objects many times in a row. Our approach uses light fields to create a probabilistic generative model for objects, enabling the robots to use all information from the camera to achieve this high precision. Additionally, learned models can be combined to form models for object category that are metrically grounded and can be used to perform localization and grasp prediction.

We can scale up this system so that the robot can come equipped with a large database of object models. This system enables the robot to automatically detect and localize novel objects. If the robot cannot pick the first time, it will automatically add a new model to its database, enabling it to increase its precision and robustness. Additionally this new model will augment the database, improving performance on novel objects.

Extending the model to full 3D perception enables it to fuse different stable configurations. We can track objects continuously over time, create a Bayes' filtering approach to object tracking. This model takes into account object affordances and actions on objects, creating a full object-oriented MDP. Ultimately objects like doors, elevators, and drawers can be modeled in an instance-based way, and then generalized to novel instances. This model is ideal for connecting to language because it factors the world into objects, just as people do when they talk about them.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method comprising:
   as a robot encounters an object, creating a probabilistic object model (POM) to identify, localize, and manipulate the object, the probabilistic object model using a pixel-based inverse graphics approach based around light fields to enable inference of the object for object detection and localization while incorporating information from every pixel of images observed from across multiple camera locations.

2. The method of claim 1 wherein creating the probabilistic object model comprises rendering an observed view from images and poses at a particular plane.

3. The method of claim 2 wherein rendering the observed view from images and poses at the particular plane comprises computing a maximum likelihood estimate from image data by finding a sample mean and variance for pixel values observed at each cell using a calibration function.

4. The method of claim 3 wherein creating the probabilistic object model further comprises rendering a predicted view given a scene with objects and appearance models.

5. The method of claim 4 wherein creating the probabilistic object model further comprises inferring a scene.

6. The method of claim 5 wherein inferring the scene comprises computing an observed map and incrementally adding objects to the scene until the discrepancy is less than a predefined threshold.

7. The method of claim 6 wherein creating the probabilistic object model further comprises inferring the object.

8. A system comprising:
a robot arm;
multiple cameras locations; and
a process for creating a probabilistic object model (POM) to identify, localize, and manipulate an object, the probabilistic object model using a pixel-based inverse graphics approach based around light fields to enable efficient inference of the object for object detection and localization while incorporating information from every pixel of images observed from across the multiple camera locations.

9. The system of claim 8 wherein creating the probabilistic object model comprises rendering an observed view from images and poses at a particular plane.

10. The system of claim 9 wherein rendering the observed view from images and poses at the particular plane comprises computing a maximum likelihood estimate from image data by finding a sample mean and variance for pixel values observed at each cell using a calibration function.

11. The system of claim 10 wherein creating the probabilistic object model further comprises rendering a predicted view given a scene with objects and appearance models.

12. The system of claim 11 wherein creating the probabilistic object model further comprises inferring a scene.

13. The system of claim 12 wherein inferring the scene comprises computing an observed map and incrementally adding objects to the scene until the discrepancy is less than a predefined threshold.

14. The system of claim 13 wherein creating the probabilistic object model further comprises inferring the object.

* * * * *